Sept 10, 1957 C. S. SEMAR 2,805,886
FOLDING PILLAR AND VERTICALLY MOVABLE
WINDOW ARRANGEMENT FOR VEHICLE BODIES
Filed Dec. 16, 1955 2 Sheets-Sheet 1

Inventor
Claud S. Semar
By Paul Fitzpatrick
Attorney

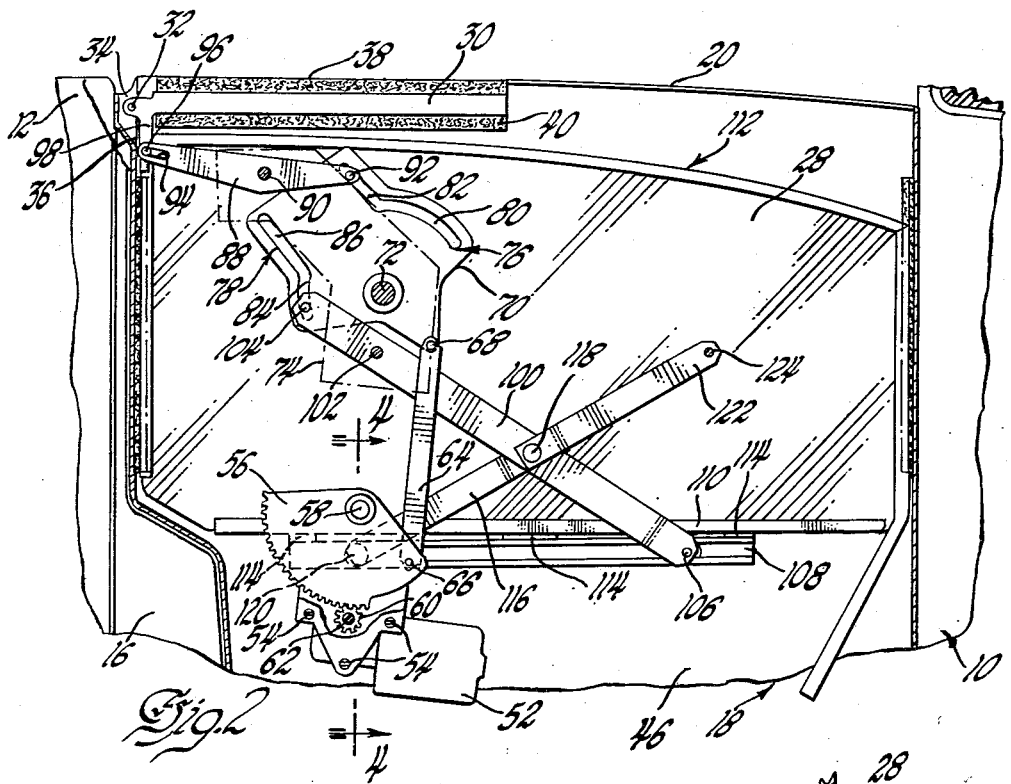

United States Patent Office 2,805,886
Patented Sept. 10, 1957

2,805,886

FOLDING PILLAR AND VERTICALLY MOVABLE WINDOW ARRANGEMENT FOR VEHICLE BODIES

Claud S. Semar, Birmingham, Mich., assignor to General Motors Corporation, Detroit, Mich., a corporation of Delaware Application December 16, 1955, Serial No. 553,463

7 Claims. (Cl. 296—48)

This invention relates to vehicle bodies and more particularly to a folding pillar and a vertically movable window arrangement for vehicle bodies wherein the pillar and window are coordinated in their movement.

The recently introduced four-door hard top sedan has no center pillar above the body belt line and no door window frames above the body belt line except for the ventilation window frame at the forward portion of the front door. This results in a continuous window opening from the rear edge of the ventilation window frame to the rear quarter area of the body when the front and rear door windows are in open position. In the closed position of the windows in sedans of this type which have been built, the front door window seals against the ventilation window frame and the roof rail and the rear door window overlaps the center pillar to seal against the front door window and the roof rail. Consequently, the rear door window must be moved rearwardly away from the center pillar before the window can be lowered within the rear door. This necessitates the use of a complex window regulator and window guide means.

This invention relates generally to four-door hard top sedans of the above described type and, in its preferred embodiment, provides a folding body pillar which is pivoted on the rear door for movement between an upright position when the rear door window is in closed position and a folded position above the rear door window when the window is in open position. The movement of the folding pillar between its folded and substantially upright positions is coordinated with the movement of the rear door window between open and closed positions. Thus, in the closed positions of both front and rear door windows, each window seals against the folding pillar to provide a simulated four-door sedan appearance to the body and in the open position of both windows the folding pillar is in folded or lowered position to provide a simulated four-door hard top sedan appearance to the body. The window may be dropped straight down within the rear door without being first moved rearwardly, and a more simple window regulator can thus be used.

An object of this invention is to provide a vehicle folding pillar and vertically movable window arrangement wherein the pillar and window are coordinated in their movement. Another object of this invention is to provide a vehicle folding pillar and vertically movable window arrangement wherein the pillar is moved to a substantially upright position upon movement of the window to closed position and is movable to a lowered or folded position upon movement of the window to open position.

These and other objects of this invention will be readily apparent from the following specification and drawings, wherein:

Figure 2 is a view similar to Figure 1 showing the folding pillar in lowered position and the window in open position;

Figure 3 is an enlarged view of a portion of Figure 1; and

Figure 4 is a sectional view on the plane indicated by line 4—4 of Figure 2.

Figure 1:
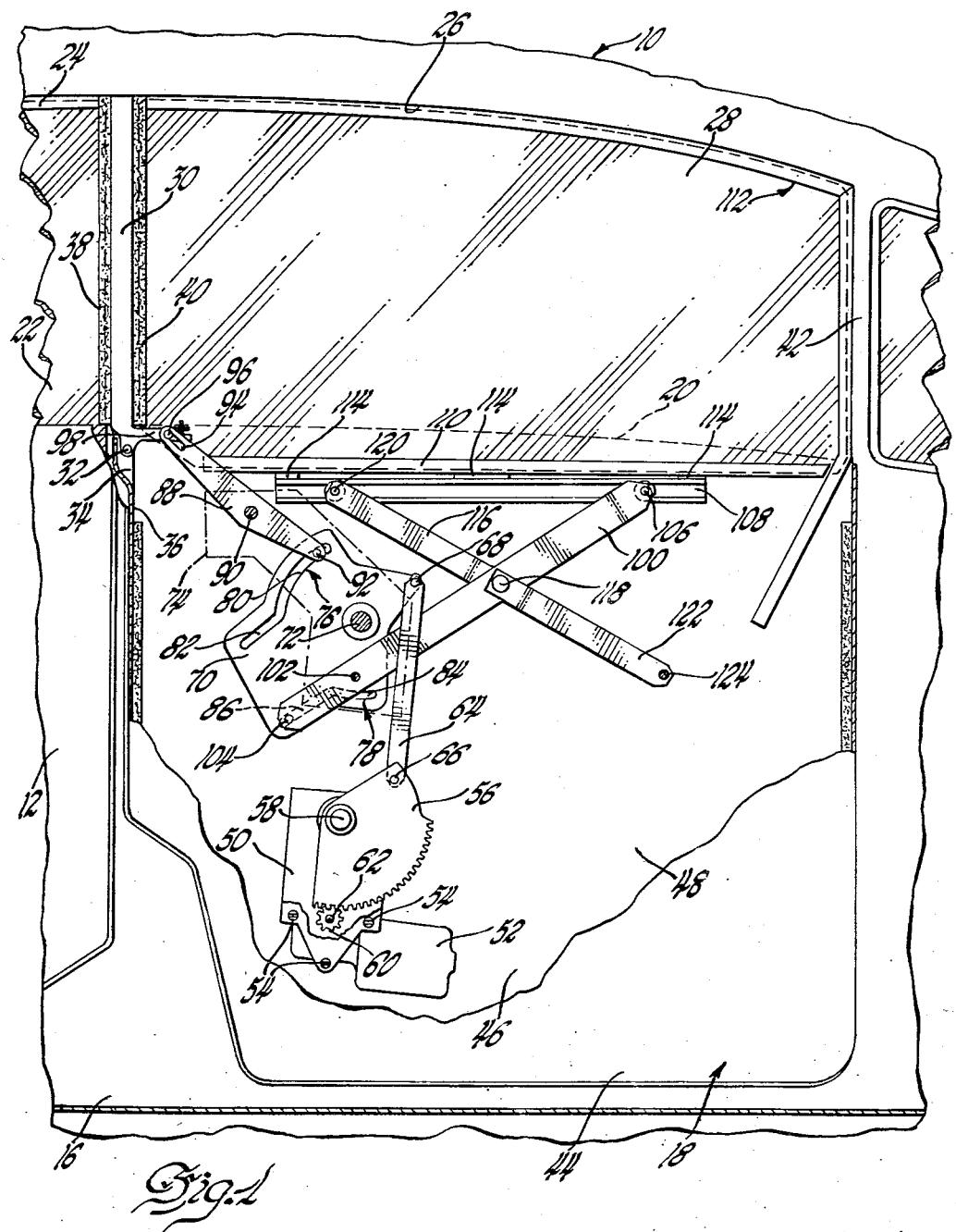
Figure 1 is a view of a vehicle body embodying a folding pillar and a vertically movable window arrangement according to this invention, with parts being broken away for clarity of illustration.

Referring now to Figure 1 of the drawings, a vehicle body 10 includes a front door 12 hinged at its forward edge to the body and latched at its rearward edge to a center pillar 16, and a rear door 18 hinged at its forward edge to the pillar 16 and latched at its rearward edge to the body. The center pillar 16 extends only from the floor of the vehicle to the body belt line which is the top edge of the front and rear doors and is indicated schematically at 20. A front door window 22 mounted within a partial window frame 24 is supported within door 12 by suitable window regulator mechanism for substantially vertical movement between open and closed positions. The window seals against the roof rail 26 in closed position and also against the ventilation window frame (not shown) extending upwardly from the forward upper edge portion of door 12 and pivotally supporting a ventilation window as is well known.

A rear door window 28 supported within door 18 by suitable window regulator mechanism seals against the roof rail 26 in the closed position of the window and also against a body pillar 30 pivotally mounted at 32 on an offset flange portion 34 of the forward wall 36 of door 18. Pillar 30 includes forward and rearward guide channels 38 and 40, respectively, which receive the rearward edge of the front door window 22 and the forward edge of the rear door window 28 in their closed position, as shown in Figure 1, to provide a simulated four-door sedan type appearance to body 10. Pillar 30 is coordinated in its movement to lower position with movement of window 28 to an open position. In the open position of windows 22 and 28 and the lowered position of pillar 30, as shown in Figure 2, a continuous window opening results from the rear edge of the front door ventilation window frame to the rear door pillar 42 of the body to provide a simulated four-door hard top type appearance to the body.

Referring now to Figure 1 of the drawings, the mechanism which controls movement of the rear door window 28 to open and closed positions and also coordinates movement of the window with movement of body pillar 30 will be described. The rear door 18 includes inner and outer door panels 44 and 46, respectively, which define a window well 48. A back plate 50 is secured to the inner door panel 44 in a suitable manner and supports a motor and gear reduction assembly 52 which is secured to the back plate 50 at 54. A sector gear 56 is pivotally mounted on back plate 50 at 58 in mesh with spur gear 60 which is pivoted on the back plate at 62 and is driven by the motor and gear reduction assembly 52.

A link 64 is pivotally secured to sector 56 at 66 at one end thereof and the other end of the link is pivotally secured at 68 to a plate member 70. Plate member 70 is pivoted at 72 to a support plate 74 indicated schematically in Figure 1, which is secured to the inner door panel 44 of door 18. Plate 70 includes a pair of slots 76 and 78 with slot 76 having an arcuate portion 80 having its center at pivot 72 and a straight portion 82 joined to arcuate portion 80. Slot 78 has an arcuate portion 84 having its center at pivot 72 and a straight portion 86 joined to the arcuate portion 84.

An arm 88 is pivoted on plate 74 at 90 and one end of the arm mounts a stud 92 which is slidably and rotatably received within slot 76 of plate 70. The other end of the arm includes a slot 94 which slidably and rotatably receives a stud 96 secured to a laterally extending arm portion 98 of pillar 30. A window lift arm 100 is pivoted on support plate 74 at 102 and includes a stud 104 at one end thereof which is slidably and rotatably received within slot 78. The other end of the lift arm mounts a stud 106 which is slidably and rotatably received within a channel member 108 secured to the lower frame member 110 of the rear door window frame 112 by means of three U-shaped brackets 114 of variable width as shown in Figure 1. An arm 116 is pivoted at 118 at one end thereof on lift arm 100 and the other end of arm 116 mounts a stud 120 which is slidably and rotatably received within channel 108. An arm 122 is also pivoted at one end thereof on lift arm 100 at 118 and the other end of the arm is pivoted on the inner door panel 44 at 124. Pivot 118 is of the shouldered stud type to provide a pivotal support for arms 116 and 122 on lift arm 100 and also holds the arms in a substantially aligned relationship as shown in Figure 1.

Referring now to Figures 1 and 2 of the drawings, the operation of the mechanism will now be described. In the upright position of pillar 30 and the closed position of window 28, stud 92 of arm 88 is received adjacent the end of the arcuate portion 80 of slot 76 and stud 104 of lift arm 100 is received adjacent the end of the relatively straight portion 86 of slot 78. When it is desired to lower the window 28 within the door well to open position and to move the body pillar 30 to a lowered or folded position, the motor and gear reduction assembly 52 is operated to swing sector 56 in a clockwise direction about its pivotal support 58 on the back plate 50. This will shift link 64 downwardly to swing plate 70 in a clockwise direction about its pivotal support 72 on plate 74.

Since the arcuate portion 80 of slot 76 has its center at pivot 72, clockwise swinging movement of plate 70 about pivot 72 will not operate to move arm 88 about its pivot 90. However, as plate 70 moves clockwise about pivot 72, the straight portion 86 of slot 78 will operate against stud 104 to swing the window lift arm 100 clockwise about is pivotal support 102 on plate 74. Clockwise swinging movement of the window lift arm 100 will move the window 28 downwardly within the window well as stud 106 of the lift arm slides in channel 108. Arms 116 and 122 operate as a balance arm as the window moves within the well and control the vertical movement of the forward portion of the window. As can be seen from a comparison of Figures 1 and 2, the lift arm 100 crosses arms 116 and 122 prior to moving the window 28 to a fully closed position.

When the window has been moved to a fully closed position, stud 104 of lift arm 100 is positioned in the arcuate portion 84 of slot 78 adjacent the junction of this portion with the relatively straight portion 86 of the slot, while stud 92 of arm 88 is positioned within the relatively straight portion 82 of slot 76 adjacent the junction of the relatively straight portion with the arcuate portion. Thus, upon continued swinging movement of plate 70 in a clockwise direction about pivot 72, stud 104 will ride in the arcuate portion 84 of slot 78 without imparting any movement to the window lift arm 100. However, the relatively straight portion 82 of slot 76 will operate against stud 92 of arm 88 to swing arm 88 counterclockwise about its pivotal support 90 on plate 74 to move body pillar 30 from its substantially upright position as shown in Figure 1 to its lowered position above window 28 as shown in Figure 2. During this movement of the pillar, slot 94 of arm 88 operates against stud 96 of the pillar to swing the pillar about its pivotal support 32 on the front wall of door 18. By providing a lost motion connection between arm 88 and pillar 30 binding between the arm and stud 96 is prevented during movement of the body pillar.

When it is desired to close window 28 and move pillar 30 from its position above the window to a substantially upright position, motor and gear reduction assembly 52 is operated to move sector gear 56 in a counterclockwise direction about its pivotal support 58 on plate 50.

Counterclockwise movement of sector 56 will operate to shift link 64 upwardly to swing plate member 70 counterclockwise about its pivot 72. Since stud 104 of lift arm 100 is positioned within the arcuate portion 84 of slot 78 in the closed position of the window, as shown in Figure 2, counterclockwise movement of plate member 70 about its pivotal support 72 will not impart any movement to the lift arm. However, stud 92 of arm 88 is positioned within the relatively straight portion 82 of slot 76 and counterclockwise movement of plate member 70 will cause slot portion 82 to swing arm 88 clockwise about its pivot 90 to move the body pillar 30 from its folded position as shown in Figure 2 to its upright position as shown in Figure 1 by engagement of slot 94 of arm 88 with stud 96 of the body pillar.

When the body pillar 30 has been moved to its upright position, stud 104 of the lift arm is positioned within the relatively straight portion 86 of slot 78 adjacent the junction of the straight portion with the arcuate portion 84. Stud 92 of arm 88 is positioned within the arcuate portion 80 of slot 76 adjacent the junction of this portion with the relatively straight portion 82. Thus, upon continued swinging movement of plate member 70 about pivot 72 in a counterclockwise direction the relatively straight portion 86 of slot 78 will operate against stud 104 of the lift arm to swing the lift arm counterclockwise about its pivot 102 and move window 28 to a fully closed position. During this movement of the window to fully closed position, arms 116 and 122 balance the forward portion of the window and these arms cross over lift arm 100 as the window moves to its fully closed position as can be seen from a comparison of Figures 1 and 2. Since stud 92 of arm 88 is positioned within the arcuate portion 80 of slot 76 during movement of the window to its fully closed position, no movement will be imparted to this arm. In the fully closed position of the window and the upright position of the pillar 30, stud 92 is positioned adjacent the end of the arcuate portion 80 of slot 76 and stud 104 of lift arm 100 is positioned adjacent the end of the relatively straight portion 86 of slot 78 preparatory to another cycle of operation.

Referring now particularly to Figure 3 of the drawings, an angular bracket 130 secured to the door outer panel 46 supports a threaded adjusting screw 132 which is adapted to engage a shoulder 134 on the laterally extending arm portion 98 of pillar 30 in the upright position of the pillar to locate the pillar in this position.

Thus, this invention provides a folding pillar and a vertically movable window arrangement for vehicle bodies wherein the pillar and window are coordinated in their movement. In the closed position of the window and the upright position of the pillar, the body has an appearance similar to a four-door sedan while in the open position of the window and the folded position of the pillar the body has an appearance similar to a four-door hard top.

Although a specific embodiment of this invention has been shown and described, various changes and modifications may be made within the scope and spirit of the invention.

I claim:

1. In a vehicle body having a window opening therein and a body well below said opening, a window supported on said body for movement between an open position within said well and a closed position within said opening, a body pillar structure movably supported on said body at one side of said window for movement between an out of the way position and an operating position within said opening in abutting relationship with an edge portion of said window in the closed position thereof, and common operating means alternately operatively connectable and alternately non-operatively connectable with said pillar structure and said window for sequential operation and non-operation thereof.

2. In a vehicle body having a window opening therein and a body well below said opening defined by inner and outer body panels, a window supported on said body for movement between an open position within said well and a closed position within said opening, a body pillar structure movably supported on said body to one side of said window for movement between a lowered position within said well and an upright position within said opening in abutting relationship with an edge of said window in the closed position thereof, lever means for moving said window between open and closed positions and for moving said pillar between a lowered position and an upright position, and common operating means alternately operatively connectable to said body pillar structure and said window and including lost-motion means alternately non-operatively connectable thereto to provide for alternate and sequential operation and non-operation thereof.

3. In a vehicle body having a window opening therein and a body well below said opening defined by inner and outer body panels, a window supported on said body for movement between an open position within said well and a closed position within said opening, a body pillar structure movably supported on said body to one side of said window for movement between a lowered position within said well and an upright position within said opening in abutting relationship with an edge of said window in the closed position thereof, lever means operatively connected to said pillar for movement thereof between a lowered position and a substantially upright position, lift arm means operatively secured to said window for movement thereof between an open position and a closed position, and operating means swingably supported within said well and alternately operatively slidably and pivotally secured to said lever means and said lift arm means and alternately slidably and pivotally non-operatively secured thereto to provide for sequential operation and non-operation thereof.

4. In a vehicle body having a window opening therein and a body well below said opening, a window supported on said body for movement between an open position within said well and a closed position within said opening, a body pillar structure pivotally supported on said body to one side of said window for movement between a lowered position within said well and an upright position within said opening in abutting relationship with an edge of said window in the closed position thereof, lever means pivotally supported within said well and operatively connected to said pillar for movement thereof between a lowered position and a substantially upright position upon swinging movement of said lever means, lift arm means pivotally supported within said well and operatively secured to said window for movement thereof between an open position and a closed position upon swinging movement of said lift arm means, and operating means swingably supported within asid well and including slot means slidably and pivotally secured to said lever means and said lift arm means for sequential swinging movement thereof.

5. In a vehicle body having a window opening therein and a body well below said opening, a window supported on said body for movement between an open position within said well and a closed position within said opening, a body pillar structure pivotally suppoted on said body to one side of said window for movement between a lowered position within said well and an upright position within said opening in abutting relationship with an edge of said window in the closed position thereof, lever means pivotally supported within said well and operatively connected to said pillar for movement thereof between a lowered position and a substantially upright position upon swinging movement of said lever means, lift arm means pivotally supported within said well and operatively secured to said window for movement thereof between an open position and a closed position upon swinging movement of said lift arm means, operating means swingably supported within said well and including slot means having operative and inoperative portions, said slot means being slidably and pivotally secured to said lever means and said lift arm means, and means for swinging said operating means to cause slidable and pivotal movement of said arm means and said lever means within said slot means for sequential swinging movement thereof.

6. In a vehicle body having a window opening therein and a body well below said opening, a window supported on said body for movement between an open position within said well and a closed position within said opening, a body pillar structure pivotally supported on said body to one side of said window for movement between a lowered position within said well and an upright position within said opening in abutting relationship with an edge of said window in the closed position thereof, lever means pivotally supported within said well and operatively connected to said pillar for movement thereof between a lowered position and a substantially upright position upon swinging movement of said lever means, lift arm means pivotally supported within said well and operatively secured to said window for movement thereof between an open position and a closed position upon swinging movement of said lift arm means, operating means swingably supported within said well and including slot means having operative and inoperative portions, said slot means being slidably and pivotally secured to said lever means and said lift arm means, and means for swinging said operating means to cause slidable and pivotal movement of said arm means and said lever means alternately between the operative and inoperative portions of said slot means to obtain sequential movement thereof.

7. In a vehicle body having a window opening therein and a body well below said opening, a window supported on said body for movement from an open position within said well to a closed position within said opening, a body pillar structure pivotally supported on said body to one side of said window for movement between a lowered position within said well and an upright position within said opening in abutting relationship with an edge of said window in the closed position thereof, lever means pivotally supported within said well and operatively connected to said pillar for movement thereof between a lowered position and a substantially upright position upon swinging movement of said lever means, lift arm means pivotally supported within said well and operatively secured to said window for movement thereof between an open position and a closed position upon swinging movement of said lift arm means, operating means swingably supported within said well and including spaced slot means, each of said slot means including an operative elongated portion and an inoperative arcuate portion having its center at the pivotal support of said operating means, said lever means and said lift arm means being swingably and pivotally secured within said slot means, and means for swinging said operating means to cause slidable and pivotal movement of said arm means and said lever means alternately between said operative and inoperative portions of said slot means for sequential swinging movement thereof.

References Cited in the file of this patent

UNITED STATES PATENTS

| | | |
|---|---|---|
| 1,752,511 | Smith | Apr. 1, 1930 |
| 1,909,168 | Carr | May 16, 1933 |
| 2,080,936 | Smith | May 18, 1937 |